US012460065B2

(12) United States Patent
Kong et al.

(10) Patent No.: US 12,460,065 B2
(45) Date of Patent: Nov. 4, 2025

(54) THERMAL INTERFACE MATERIALS BASED ON TWO-PART POLYURETHANES

(71) Applicant: Henkel AG & Co. KGaA, Duesseldorf (DE)

(72) Inventors: Stanley Shengqian Kong, Bridgewater, NJ (US); Valerie Alexis, Bridgewater, NJ (US); Maria Cristina Barbosa Dejesus, Bridgewater, NJ (US); Claudia Meckel-Jonas, Duesseldorf (DE); Elizabeth Jackson, Minneapolis, MN (US); Chunyong Wu, Chanhassen, MN (US)

(73) Assignee: Henkel AG & Co. KGaA, Duesseldorf (DE)

( * ) Notice: Subject to any disclaimer, the term of this patent is extended or adjusted under 35 U.S.C. 154(b) by 811 days.

(21) Appl. No.: 17/445,012

(22) Filed: Aug. 13, 2021

(65) Prior Publication Data

US 2021/0371620 A1 Dec. 2, 2021

Related U.S. Application Data

(63) Continuation of application No. PCT/US2020/019588, filed on Feb. 25, 2020.
(Continued)

(51) Int. Cl.
*C08K 3/22* (2006.01)
*C08G 18/22* (2006.01)
*C08G 18/48* (2006.01)

(52) U.S. Cl.
CPC ............. *C08K 3/22* (2013.01); *C08G 18/227* (2013.01); *C08G 18/4812* (2013.01);
(Continued)

(58) Field of Classification Search
CPC ............ C08G 18/4812; C08G 18/4825; C08G 18/4829; C08K 2201/001; C08K 3/38;
(Continued)

(56) References Cited

U.S. PATENT DOCUMENTS 6,169,142 B1   1/2001   Nakano et al.
6,924,335 B2   8/2005   Fan et al.
(Continued)

FOREIGN PATENT DOCUMENTS

CN     1501483 A     6/2004
CN   101516957 A     8/2009
(Continued)

OTHER PUBLICATIONS

Aungsukiatethavorn et al., a New Tool for PUD Design, PCI Paint & Coatings Industry article (Year: 2018).*
(Continued)

*Primary Examiner* — Catherine S Branch
*Assistant Examiner* — Huihong Qiao
(74) *Attorney, Agent, or Firm* — Sun Hee Lehmann (57) ABSTRACT

Disclosed herein are thermal interface materials based on two-part polyurethane resins comprising a polyurethane resin and a thermally conductive filler dispersed throughout the polyurethane resin, wherein the polyurethane resin is formed from two parts comprising: a first part comprising a triol, and a second part comprising an isocyanate-functionalized component, wherein at least one of the first part and the second part comprises a thermally conductive filler material.

21 Claims, 1 Drawing Sheet

Related U.S. Application Data (60) Provisional application No. 62/810,157, filed on Feb. 25, 2019.

(52) U.S. Cl.
CPC ..... *C08G 18/4825* (2013.01); *C08G 18/4829* (2013.01); *C08K 2003/2227* (2013.01); *C08K 2201/001* (2013.01)

(58) Field of Classification Search
CPC ...... C08K 2003/222; C08K 2003/2296; C08K 2003/282; C08K 2003/385; C08L 75/04
See application file for complete search history.

(56) References Cited

U.S. PATENT DOCUMENTS

| | | | |
|---|---|---|---|
| 8,445,584 B2 | 5/2013 | Uchida | |
| 9,505,025 B2 | 11/2016 | Comeau et al. | |
| 2003/0158327 A1† | 8/2003 | Han | |
| 2007/0055038 A1* | 3/2007 | Gimmnich | C08G 18/16 528/49 |
| 2010/0208429 A1 | 8/2010 | Zhang et al. | |
| 2014/0329084 A1 | 11/2014 | Poncet et al. | |
| 2015/0368435 A1 | 12/2015 | Ohno | |
| 2016/0137900 A1 | 5/2016 | Lin | |
| 2017/0335046 A1 | 11/2017 | Delajon et al. | |
| 2018/0155590 A1 | 6/2018 | Schmatloch et al. | |
| 2018/0346756 A1* | 12/2018 | Burckhar | C09D 175/08 |
| 2019/0367662 A1* | 12/2019 | Kanai | C08G 18/36 |
| 2020/0274213 A1† | 8/2020 | Cho | |
| 2021/0028414 A1* | 1/2021 | Cho | H01M 2/02 |

FOREIGN PATENT DOCUMENTS

| | | | | |
|---|---|---|---|---|
| CN | 105623588 A | | 6/2016 | |
| CN | 108276949 A | | 7/2018 | |
| CN | 109021204 A | | 12/2018 | |
| JP | S6071625 A | | 4/1985 | |
| JP | 6350764 B2 | † | 6/2008 | |
| JP | 2010248350 A | | 11/2010 | |
| JP | 2018135508 A | | 8/2018 | |
| KR | 20150095216 A | | 8/2015 | |
| KR | 1020150007849 A | | 7/2016 | |
| WO | 2014126141 A1 | | 8/2014 | |
| WO | 2016200231 A1 | † | 12/2016 | |
| WO | WO2018179845 A1 | * | 10/2018 | ............ C08L 75/04 |
| WO | 2019173058 A1 | | 9/2019 | |
| WO | 2020227962 A1 | | 11/2020 | |

OTHER PUBLICATIONS

Triethylenetetramine modified carbon nanotube functions as thermal conductive filler (Year: 2010).*

International Search Report for International PCT Patent Application No. PCT/US2020/019588 dated Jun. 16, 2020.

Sarvar et al., Thermal interface materials—a review of the state of the art. In: Proceedings of the 1st IEEE Electronic Systemintegration Technology Conference, Dresden, Sep. 5-7, 2006, vol. 2, pp. 1292-1302.

KPX Chemical, Products, Polyurethane, C.A.S.E., http://www.kpxchemical.com/eng/product/product.php?pro_cate=urethane&pro_code=50&pro_id=36&current_code=501010, (retrieved Apr. 21, 2022).†

Kowa American Chemical Corporation, Low and Ultra low Viscosity HDI based polyisocyanates, https://www.kowachemical.com/product/low-viscosity-hdi-polyisocyanates (retrieved Apr. 21, 2022).†

\* cited by examiner
† cited by third party

THERMAL INTERFACE MATERIALS BASED ON TWO-PART POLYURETHANES

BACKGROUND OF THE INVENTION

Electronic devices typically generate a significant amount of heat during operation. To cool these devices, heat sinks are typically affixed in some manner to the device. In operation, heat generated by the electronic device during use is transferred from a heat source of the device to a heat sink, where the heat is harmlessly dissipated. Thermal interface materials generally operate by expelling excess thermal energy generated by the heat source to the heat sink.

The thermal interface material will ideally provide an intimate contact between the heat sink and the heat source to facilitate heat transfer between the two.

Ordinarily, these thermal interface materials are utilized in connection with heat-generating electronic components, such as integrated circuits (IC), central processing units (CPU), amongst others. Commonly, either a paste-like thermally conductive material, such as silicone grease, or a sheet-like thermally conductive material, such as silicone rubber is utilized as the thermal interface material. The performance of thermal interface materials is usually graded using both thermal conductivity and thermal resistance. For example, while some pastes and greases provide low thermal resistance, they must be applied in a liquid or semi-solid state and thus require manufacturing controls to optimize their application. In addition to enhanced controls during application, the handling of the paste or grease materials can be messy and difficult. Further, greases and pastes are not capable of utilization on non-planar surfaces. Additional difficulties in utilizing existing materials include controls upon reapplication for pastes, migration of grease to unwanted areas, and re-workability for phase change materials or thermoset pastes. Traditional thermal interface pads address the handling and application problems of pastes and greases, however they typically have a higher thermal resistance as compared to pastes and greases. Thermal interface pads can be pre-cured, can cure in place, and can be made from one or two-part compositions.

Further, many thermal interface materials are made by dispersing thermally conductive fillers in a polymer matrix and many thermal interface materials contain silicon. Silicon-containing thermal interface materials have issues with bleeding and outgassing and thus can contaminate the device. Non-silicon containing thermal interface materials, on the other hand can suffer from low thermal conductivity and high hardness.

Thermal interfaces play a huge factor in a device's operation both in performance and reliability. These materials can be used to accelerate heat dissipation and give the cost-effective method needed for flexibility to reduce overall size of the package.

Accordingly, there remains a need for a thermal interface material based on an alternative chemistry to silicone that does not release siloxane species and therefore does not contaminate surrounding structures and extends the life of the device. It remains advantageous to provide a thermal interface material that is easy to handle and apply, yet also provides a low thermal resistance.

BRIEF SUMMARY OF THE INVENTION

A composition for use as a thermal interface material is provided. The composition comprises a polyurethane resin and a thermally conductive filler dispersed throughout the polyurethane resin, wherein the polyurethane resin is formed from two parts comprising: a first part comprising a triol, and a second part comprising an isocyanate-functionalized component, wherein at least one of the first part and the second part comprises a thermally conductive filler material.

Another aspect of the present invention provides an electronic device containing a heat source, a heat sink and a thermal interface material according to the above description disposed therebetween.

DETAILED DESCRIPTION OF THE INVENTION

Disclosed herein is a composition for use as a thermal interface material ("TIM"). The composition comprises a polyurethane resin formed from two parts and a thermally conductive filler dispersed throughout the polyurethane resin. The first part comprises a polyol, and the second part comprises an isocyanate-functionalized component. The first part and/or the second part can comprise the thermally conductive filler material.

The two-part polyurethane comprises lightly crosslinked polyurethane networks having at least one long pendant group with molecular weight higher than about 100 g/mol, preferably greater than about 200 g/mol, attached to each repeating urethane unit of the network. These pendant groups minimize leaching or migration concerns generally associated with thermal interface materials without the need for inclusion of a plasticizer.

The first part can include a polyol, a triol, a diol or a combination thereof. Preferably the first part includes a triol. In a preferred embodiment, the first part comprises a triol and a diol.

Triols that can be included in the first part of the compositions disclosed herein include, but are not limited to, low glass transition, low polarity resins built from a trifunctional core of trimethylolethane, trimethylolpropane, or glycerin. Preferably, the triol has a molecular weight in the range of about 500 to about 5000 g/mol. Particularly useful are polyether triols made with polypropylene glycol (PPG), polytrimethylene glycol, polytetramethylene glycol (PTMG), as well as polyester triols made with 2-methyl-1,3-propanediol adipate, etc. These products, along with their diol analogues are available from Covestro (Acclaim®, Arcol® series), Dow (Voranol® series), LyondellBasell (Polymeg), BASF (PolyTHF series), Kuraray (Polyol series), Arkema (Adiansol® series), etc.

Preferably, if polyols are utilized in the compositions disclosed herein, the polyols have a hydroxyl functionality of at least two and molecular weights in the range of about 200 to about 5000 g/mol. The polyols contemplated for use in the compositions disclosed herein include, but are not limited to polyester polyols, polyether polyols, polyolefin polyols, polycarbonate polyols and mixtures and copolymers thereof. These polyols may further contain unsaturation, aromaticity, and/or heteroatoms as a part of their structure. Aside from linear polyols, the polyols that can be used in the composition may also be branched or cyclic.

In a preferred embodiment, the first part further comprises a polyol prepared from polymerization and copolymerization of hydroxyl functionalized vinyl monomers with low glass transition temperature monomers such as butyl acrylates and 2-ethylhexyl acrylate.

If the compositions disclosed herein further include diols, preferably the diols are included in the first part. Preferably, the diol has a molecular weight in the range of about 200 to about 5000 g/mol. In addition to polyether, polyester, as well as polycarbonate diols mentioned above, polyolefin diols such as polybutadiene diol, hydrogenated polybutadiene diol as well as polyfarnesene diol can be used. Examples include Cray Valley's KRASOL® LBH-P series, HLBH P series, Krasol F 3000, Nippon Soda's G and GI series. Another type of non-polar diol is dimer diol from Croda known as Pripol™ 2033, along with its polyester oligomer diols.

In another preferred embodiment, the first part further comprises a polysiloxane diol. These materials generally contain very low level of cyclic siloxane volatiles. Examples include Dow Corning 5562 Carbinol.

The balance between the triols, the diols, and mono-ols, if present, can be adjusted to change the hardness of the composition. The effectiveness of the thermal interface material to transfer heat is significantly impacted by the interface between the thermal interface material and the heat source and a soft, conformable material can optimize the contact at the interface. To optimize the hardness of the composition, in a preferred embodiment, the triol is present in the first part in an amount from about 29 wt. % to about 100 wt. % based on the total weight of the first part, more preferably the triol is present in the first part in an amount greater than about 57 wt. % based on the total weight of the first part.

The isocyanate-functionalized component present in the second part of the composition comprises one or more of various suitable mono-, di-, and multifunctional isocyanate resins and pre-polymers.

Examples of suitable isocyanate-functionalized components for use in the composition include aromatic isocyanates such as 1.5-naphthylene diisocyanate, 2,4- or 4,4'-diphenylmethane diisocyanate (MDI), carbodiimide modified MDI, xylylene diisocyanate (XDI), m- and p-tetramethylxylylene diisocyanate (TMXDI), the isomers of toluene diisocyanate (TDI), 4,4'-diphenyl-dimethylmethane diisocyanate, di- and tetraalkyl diphenylmethane diisocyanate, 1.3-phenylene diisocyanate, 1,4-phenylene diisocyanate, 4,4'-dibenzyl diisocyanate; aliphatic isocyanates, such as hydrogenated MDI (H12MDI), 1-methyl-2,4-diisocyanatocyclohexane, 1,12-diisocyanatododecane, 1,6-diisocyanato-2,2,4-trimethyl-hexane, 1,6-diisocyanato-2,4,4-trimethyl hexane, 1-isocyanatomethyl-3-isocyanato-1.5.5 trimethyl cyclohexane (IPDI), tetramethoxybutane-1,4-diisocyanate, butane-1,4-diisocyanate, hexane-1,6 diisocyanate (HDI), dimeric fatty acid diisocyanate, di cyclohexyl methane diisocyanate, cyclohexane-1,4-diisocyanate, ethylene diisocyanate or phthalic acid bis isocyanato ethyl ester. Low-molecular prepolymers may also be used, i.e., oligomers having a plurality of isocyanate groups, for example, the reaction products of MDI and/or TDI with low-molecular diols, e.g., ethylene glycol, diethylene glycol, propyleneglycol, dipropylene glycol or triethylene glycol. These oligomers are obtained with an excess of polyisocyanate in the presence of diols. The molecular weight of the diols present can be less than about 1000 g/mol. The reaction product may optionally be freed of monomers by distillation. Crude MDI or liquefied diphenylmethane diisocyanates containing carbodiimide are likewise suitable. Suitable aliphatic isocyanates include isocyanurates, carbodiimides and biurets of isocyanates, in particular of HDI or IPDI.

Further, a variety of isocyanates suitable for use herein are available commercially and/or obtainable using known procedures. Aromatic diisocyanate and aliphatic diisocyanate prepolymers are commercially available from Covestro under the trade name Desmodur and Mondur respectively, for example, Mondur MRS-2, Mondur MRS-4, Desmodur LD, Mondur MA-2300, Desmondur XP XP2599. Blocked isocyanate is also available from Covestro under the Desmodur BL trade name, such as Desmodur BL 1100/1. Other commercially available isocyanates are available from Mitsui Chemicals sold as Takenate. Preferably, the isocyanate-functionalized component comprises a difunctional isocyanate.

More preferably, the isocyanate-functionalized component comprises a difunctional aliphatic isocyanate with a long pendant group, wherein the long pendant group is a polyether, or a linear or branched alkyl, ester, polyester structure, which may further contain unsaturation or heteroatoms, or a combination thereof. A preferred aliphatic polyisocyanate is commercially available from Vencorex under the trade name Tolonate™ X FLO 100 has the following structure wherein R is an undisclosed bio-derived long pendant group:

Filler

The composition disclosed herein further includes a filler that preferably comprises a thermally conductive filler. The filler can be included in the first part, the second part, or both the first and second parts.

Thermally conductive fillers are known in the art and commercially available, see for example, U.S. Pat. No. 6,169,142 (col. 4, lines 7-33). The thermally conductive filler may be both thermally conductive and electrically conductive. Alternatively, thermally conductive filler may be thermally conductive and electrically insulating.

Specifically, useful thermally conductive fillers may comprise a metallic filler, an inorganic filler, a carbon-based filler, a thermally conductive polymer particle filler, or a combination thereof.

Metallic fillers include particles of metals and particles of metals having layers on the surfaces of the particles. These layers may be, for example, metal nitride layers or metal oxide layers on the surfaces of the particles. Suitable metallic fillers are exemplified by particles of metals selected from the group comprising aluminum, copper, gold, nickel, silver, and combinations thereof. Suitable metallic fillers are further exemplified by particles of the metals listed above having layers on their surfaces selected from the group comprising aluminum nitride, aluminum oxide, copper oxide, nickel oxide, silver oxide, and combinations thereof. For example, the metallic filler may comprise aluminum particles having aluminum oxide layers on their surfaces.

Inorganic fillers can include metal oxides such as aluminum oxide, beryllium oxide, magnesium oxide, and zinc oxide; nitrides such as aluminum nitride and boron nitride; carbides such as silicon carbide and tungsten carbide; and combinations thereof. Other examples include aluminum trihydrate, silicone dioxide, barium titanate, magnesium hydroxide.

Carbon-based fillers can include carbon fibers, diamond, graphite. Carbon nanostructured materials, such as one-dimensional carbon nanotubes (CNTs) and two-dimensional (2D) graphene and graphite nanoplatelets (GNPs) could also be used in the composition due to their high intrinsic thermal conductivity.

Examples of thermally conductive polymer fillers include oriented polyethylene fibers and nanocellulose. Other examples of polymers that could be used to make thermally conductive fillers include polythiophene, liquid crystalline polymers based on polyesters or epoxies, etc.

The shape of useful thermally conductive filler particles is not restricted; however, rounded or spherical particles may prevent viscosity increase to an undesirable level upon high loading of thermally conductive filler in the composition. Thermally conductive filler may be a single thermally conductive filler or a combination of two or more thermally conductive fillers that differ in at least one property such as particle shape, average particle size, particle size distribution, and type of filler. For example, a combination of inorganic fillers, such as a first aluminum oxide having a larger average particle size and a second aluminum oxide having a smaller average particle size can be included in the composition. Alternatively, a combination of an aluminum oxide having a larger average particle size with a zinc oxide having a smaller average particle size can be included in the composition. Combinations of metallic fillers, such as a first aluminum having a larger average particle size and a second aluminum having a smaller average particle size can alternatively be included in the composition. Further, combinations of metallic and inorganic fillers, such as a combination of aluminum and aluminum oxide fillers; a combination of aluminum and zinc oxide fillers; or a combination of aluminum, aluminum oxide, and zinc oxide fillers can alternatively be included in the compositions disclosed herein. The use of a first filler having a larger average particle size and a second filler having a smaller average particle size than the first filler may improve packing efficiency, may reduce viscosity, and may enhance heat transfer.

The thermally conductive filler may also include a filler treating agent. The filler treating agent may be any treating agent known in the art. The amount of filler treating agent may vary depending on various factors including the type and amounts of thermally conductive fillers. In a preferred embodiment, the filler treating agent will be included in the composition in an amount in the range of about 0.1 wt. % to about 5.0 wt. % of the filler.

The filler may be treated with filler treating agent in situ or pretreated before being combined with the resin to make the composite. The filler treating agent may comprise a silane such as an alkoxysilane, an alkoxy-functionalized oligosiloxane, a cyclic polyorganosiloxane, a hydroxyl-functionalized oligosiloxane such as a dimethyl siloxane or methyl phenyl siloxane, a stearate, or a fatty acid. Alkoxysilane filler treating agents are known to the art and are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof.

Alternatively, the filler treating agent can be any organosilicon compounds typically used to treat silica fillers. Examples of these organosilicon compounds include, but are not limited to, organochlorosilanes such as methyltrichlorosilane, dimethyldichlorosilane, and trimethyl monochiorosilane; organosiloxanes such as hydroxy-endblocked dimethylsiloxane oligomer, hexamethyldisiloxane, and tetramethyldivinyldisiloxane; organosilazanes such as hexamethyldisilazane and hexamethylcyclotrisilazane; and organoalkoxysilanes such as methyltrimethoxysilane, vinyltrimethoxysilane, vinyltriethoxysilane, 3-glycidoxypropyltrimethoxysilane, and 3-methacryloxypropyltrimethoxysilane.

Alternatively, a polyorganosiloxane capable of hydrogen bonding is useful as a filler treating agent.

In certain embodiments, in addition to thermally conductive filler, the filler may also comprise a reinforcing filler, an extending filler, or a combination thereof.

When the compositions disclosed herein are in thermal interface materials, electrically insulating, thermally conductive fillers are commonly included. Preferably, the thermally conductive filler material for use in the composition disclosed herein is selected from the group comprising aluminum oxide, boron nitride, aluminum nitride, magnesium oxide, zinc oxide, or a combination thereof. For commercial sources, CB-A205 and Al-43-Me are aluminum oxide fillers of differing particle sizes commercially available from Showa-Denko, DAW-45 is aluminum oxide filler commercially available from Denka, and AA-04, AA-2, and AA18 are aluminum oxide fillers commercially available from Sumitomo Chemical Company. Zinc oxides are available from Zochem LLC.

Other suitable fillers and/or additives may also be added to the compositions disclosed herein to achieve various composition properties. Examples of additional components that may optionally be added include pigments, plasticizers, process aids, flame retardants, extenders, electromagnetic interference (EMI) or microwave absorbers, electrically-conductive fillers, magnetic particles, etc. A wide range of materials may be added to a thermal interface material according to exemplary embodiments, such as carbonyl iron, iron silicide, iron particles, iron-chrome compounds, metallic silver, carbonyl iron powder, SENDUST (an alloy containing 85% iron, 9.5% silicon and 5.5% aluminum), permalloy (an alloy containing about 20% iron and 80% nickel), ferrites, magnetic alloys, magnetic powders, magnetic flakes, magnetic particles, nickel-based alloys and powders, chrome alloys, and any combinations thereof. Other embodiments may include one or more EMI absorbers formed from one or more of the above materials where the EMI absorbers comprise one or more of granules, spheroids, microspheres, ellipsoids, irregular spheroids, strands, flakes, powder, and/or a combination of any or all of these shapes. Accordingly, some exemplary embodiments may thus include thermal interface materials that include or are based on thermally reversible gels, where the thermal interface materials are also configured (e.g., include or are loaded with EMI or microwave absorbers, electrically-conductive fillers, and/or magnetic particles, etc.) to provide shielding.

In a useful embodiment, thermally conductive filler material is present in the first part of the composition in an amount in the range of about 30-95 wt. %, for example from about 85-95 wt. % based on the total weight of the first part. In another useful embodiment, the thermally conductive filler material is present in the second part in an amount in the range of about 30 wt. % to about 95 wt. %, for example amount from about 85 wt. % to about 95 wt. % based on the total weight of the second part.

Catalysts

The isocyanate-functionalized compound and the polyol included in the compositions disclosed herein can react at ambient temperature to form crosslinked/cured polyurethanes without the need of a catalyst. The optional inclusion of a catalyst in the compositions can effectively speed up the reaction.

Preferably one, or several, catalysts can be included in the compositions disclosed herein to tune the curing speed depending on the application and process requirements. In the two-part composition disclosed herein, the isocyanate and polyol components are each dispensed and then mixed to be reacted. If the catalyzed reaction is too fast, the reactants may clog the dispensing mechanism. If the catalyzed reaction is too slow, the composite may flow out of the area where it is intended to be set after application and contaminate other surrounding components. Accordingly, the reaction speed is critical to obtain the desired properties of the composition. Suitable catalysts include, but are not limited to, Lewis acids and bases, and metal compounds.

Preferably, the composition can comprise a catalyst selected from the group comprising amine catalysts or metal catalysts based on Sn, Zn, Bi, Zr, V or Ti. More preferably the catalyst for use in the composition is a Zn based complex, a Bi based complex, or a combination thereof.

Tin-based compounds are conventional catalysts for the reaction of hydroxyl-containing organic molecules with isocyanates to form urethane groups. Representative members of this class of tin compounds include stannous salts of carboxylic acids, organo stannic acids such as butyl stannic acid, organo thiostannic acids, diorganotin oxides such as dibutyltin oxide, diorganotin sulfides, mono- and di organotin halides such as dimethyltin dichloride, mono and di organotin carboxylates such as dibutyltin dilaurate, dibutyltin adipate and dibutyltin maleate, mono- and di organotin mercaptides such as dibutyltin bis(lauryl mercaptide), mono- and di organotin derivatives of mercaptocarboxylic acid esters and mercaptoalkanol esters such as dibutyltin-S, S'-bis(isooctyl mercaptoacetate) and dibutyltin S,S'-bis(mercaptoethyl stearate), di organotin oxides such as dibutyltin oxide and mono- and di organotin derivatives of beta di ketones such as dibutyltin bis-acetylacetonate.

The composition may also contain a tertiary amine catalyst. The tertiary amine catalyst can activate the isocyanate group to nucleophilic substitution to promote the reaction with water to give carbon dioxide generation and to react with the polyhydroxyl compound to give urethane formation. Examples of tertiary amine catalysts include N,N dimethylaminoethanol, tris(dimethyl aminopropyl)amine, N,N-dimethyl cyclohexylamine, bis-(2-methyl aminoethyl) ether, N,N-dimethylbenzylamine, diamino bi cyclooctane, triethylamine, tributylamine, N-methyl morpholine, N-ethylmorpholine, N-coco-morpholine, N,N,N',N''-tetramethyl ethylene-diamine, 1,4-diaza-bicyclo-(2,2,2)-octane, N-methyl-N'-dimethyl-amino-ethyl piperazine, N,N-dimethylbenzylamine, bis-(N,N-diethyl-aminoethyl)-adipate, N,N diethyl benzylamine, pentamethyl diethylenetriamine, N,N dimethyl cyclohexylamine, N,N, N',N'-tetramethyl-1,3 butanediamine, N,N-dimethyl-.beta.-phenylethylamine, 1,2 dimethyl-imidazole, 2-methylimidazole and mixtures thereof. Also useful are the commercially available tertiary amines such as Niax A-1, available from WITCO.

Plasticizer

The composition may optionally further comprise up to about 80 wt. %, by weight of the composition of a liquid plasticizer in the first and/or second part. Suitable plasticizers include paraffinic oil, naphthenic oil, aromatic oil, long chain partial ether ester, alkyl monoesters, epoxidized oils, dialkyl diesters, aromatic diesters, alkyl ether monoester, polybutenes, phthalates, benzoates, adipic esters, acrylate and the like. Particularly preferred plasticizers include plasticizers with functional groups that can further react with the polyols in the first part or the isocyanate in the second part and be an integral part of the polyurethane network.

Moisture Scavenger

In one embodiment, the curable composition further comprises a moisture scavenger. Preferably the moisture scavenger is selected from the group comprising oxazolidine, p-toluenesulfonyl isocyanate, vinyloxy silane, and combinations thereof. p-toluenesulfonyl isocyanate is a particularly useful moisture scavenger.

Antioxidant or Stabilizers

The compositions disclosed herein may further optionally comprise up to about 3.0 wt. %, for example about 0.1 wt. % to about 2.5 wt. %, and preferably about 0.2 wt. % to about 2.0 wt. %, by weight of the resin composition in each part, of one or more of an antioxidant or stabilizer.

Useful stabilizers or antioxidants include, but are not limited to, high molecular weight hindered phenols and multifunctional phenols such as sulfur and phosphorus-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus provides the phenolic compound with its stabilizing properties. Representative hindered phenols include; 1,3,5-trimethyl-2, 4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-ditert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-ditert-butyl-4-hydroxy-phenyl)-propionate].

Useful antioxidants are commercially available from BASF and include Irganox®565, 1010, 1076 and 1726 which are hindered phenols. These are primary antioxidants that act as radical scavengers and may be used alone or in combination with other antioxidants, such as, phosphite antioxidants like IRGAFOS®168 available from BASF.

The inclusion of antioxidants and/or stabilizers in the compositions disclosed herein should not affect other properties of the composition.

Retarding Agents

One or more retarding agents can also be included in the composition to provide an induction period between the mixing of the two parts of the composite composition and the initiation of the cure. Preferably, the retarding agent can be 8-hydroxyquinoline.

Optional Components

Further optional components can be added to the composition, such as for example, nucleating agents, elastomers, colorant, pigments, rheology modifiers, dyestuffs, mold release agents, adhesion promoters, flame retardants, a defoamer, a phase change material, rheology modifier processing aids such as thixotropic agents and internal lubricants, antistatic agents or a mixture thereof which are known to the person skilled in the art and can be selected from a great number of commercially available products as a function of the desired properties. The amounts of these additives incorporated in into the composition can vary depending on the purpose of including the additive.

The OH functionality of a compound is to be understood as meaning its average OH functionality. It indicates the average number of hydroxyl groups per molecule. The average OH functionality of a compound can be calculated based on the number average molecular weight and the hydroxyl number. Unless indicated otherwise, hydroxyl numbers (OH numbers) are obtained from the Certificate of Analysis from the supplier.

The NCO functionality of a compound is to be understood as meaning its average NCO functionality. It indicates the average number of NCO groups per molecule. The average NCO functionality can be calculated based on the number average molecular weight and the NCO number for the compound. Unless indicated otherwise, the isocyanate content (NCO content, % NCO) is obtained from the Certificate of Analysis from the supplier.

The molar ratio of NCO to OH groups ("NCO/OH ratio") indicates the stoichiometric balance between the second part and the first part. If the NCO/OH ratio is higher than 1 it indicates that the formulation is not stoichiometrically balanced and an excess of isocyanate is present. If the NCO/OH ratio is lower than 1 it indicates that the formulation is not stoichiometrically balanced and an excess of hydroxyl groups is present.

In an exemplary embodiment, the ratio of NCO/OH ratio in the composition is less than 1.3.

TIM Materials

The composition according to this invention may be used as a thermal interface material to ensure consistent performance and long-term reliability of heat generating electronic devices. Specifically, these compositions can be used as a liquid gap filler material that can conform to intricate topographies, including multi-level surfaces. Due to the increased mobility prior to cure, the composition can fill small air voids, crevices, and holes, reducing overall thermal resistance to the heat generating device. Additionally, thermal interface gap pads can be prepared from this composition.

Manual or semiautomatic dispensing tools can be used to apply the composition directly to the target surface, resulting in effective use of material with minimal waste. Further maximization of material usage can be achieved with implementation of automated dispensing equipment, which allows for precise material placement and reduces the application time of the material. Accordingly, the viscosity of each part of the composition must be maintained such that the parts can be dispensed through the dispensing tools. Each of the first part and the second part has a viscosity of less than about 3000 mPa·s at room temperature, preferably a viscosity of about 200 to about 1000 mPa·s at room temperature.

The first part and second part of the composition can be mixed to form a composition that can be cured at room temperature. The mixed composition has a pot life of longer than about 10 minutes, and preferably longer than about 20 min. The composition, after room temperature cure, has a glass transition temperature (Tg) of less than about −20° C., preferably less than about −30° C., and Shore 00 hardness less than about 90, preferably less than about 80, and even more preferably less than about 70. Further, the cured composition is thermally stable from about −40° C. to about 125° C.

In some exemplary embodiments, a thermal interface material may include an adhesive layer. The adhesive layer may be a thermally conductive adhesive to preserve the overall thermal conductivity. The adhesive layer may be used to affix the thermal interface material to an electronic component, heat sink, EMI shield, etc. The adhesive layer may be formulated using a pressure-sensitive, thermally-conducting adhesive. The pressure-sensitive adhesive (PSA) may be generally based on compounds including acrylic, silicone, rubber, and combinations thereof. The thermal conductivity is enhanced, for example, by the inclusion of ceramic powder.

In some exemplary embodiments, thermal interface materials including thermally-reversible gel may be attached or affixed (e.g., adhesively bonded, etc.) to one or more portions of an EMI shield, such as to a single piece EMI shield and/or to a cover, lid, frame, or other portion of a multi-piece shield, to a discrete EMI shielding wall, etc. Alternative affixing methods can also be used such as, for example, mechanical fasteners. In some embodiments, a thermal interface material that includes thermally-reversible gel may be attached to a removable lid or cover of a multi-piece EMI shield. A thermal interface material that includes thermally-reversible gel may be placed, for example, on the inner surface of the cover or lid such that the thermal interface material will be compressively sandwiched between the EMI shield and an electronic component over which the EMI shield is placed. Alternatively, a thermal interface material that includes thermally-reversible gel may be placed, for example, on the outer surface of the cover or lid such that the EMI shield is compressively sandwiched between the EMI shield and a heat sink. A thermal interface material that includes thermally-reversible gel may be placed on an entire surface of the cover or lid or on less than an entire surface. A thermal interface material that includes thermally-reversible gel may be applied at virtually any location at which it would be desirable to have an EMI absorber.

Further contemplated herein is a device comprising a heat-source, a heat sink, and the compositions disclosed herein disposed therebetween. In a preferred embodiment, the device does not leave an air gap between the heat source and the heat sink.

EXAMPLES

Unless noted otherwise, the compositions listed in the following examples were created according to the following procedure. The first part (Part A) of the composition was prepared by mixing the polyols, catalyst and thermally conductive fillers using a double planetary mixer manufactured by Charles Ross & Sons company (Ross Model DPM-1Qt) under vacuum at 80° C. for about 1 hour. The second part (part B) of the composition was prepared by mixing the isocyanate, antioxidant and thermally conductive fillers using a double planetary mixer manufactured by Charles Ross & Sons company (Ross Model DPM-1Qt) under vacuum at 80° C. for about 1 hour.

Cured composites were obtained by mixing Part A with Part B in a mixing device, a Loctite dual cartridge applicator equipped with 50 cc or 200 cc 2K cartridge and a 6.3-21 static mixer attached to the end of the cartridges under 0.52 MPa for 1 minute. During dispensing, Part A and Part B are fully mixed when traveling through the static mixer under applied pressure typically ranging from 0.5 to 0.65 MPa.

Shore OO hardness was measured using a shore Durometer OO according to ASTM D2240. The storage modulus (G') of the composite was measured by Rheometric Scientific RDA III by TA Instruments. The dynamic temperature sweep test was performed by placing a composite sample between two parallel plates, then measured from about −70°

C. to about 200° C. at constant frequency of 10 rad/sec. Throughout the experiment the temperature increased by 5° C. in steps. A stable plateau modulus at higher temperatures indicate that the composite is thermally stable and can maintain the shape needed as a thermal interface material in use.

Example 1: Aromatic Isocyanate with Pedant Groups

TABLE 1

|  | Part |
|---|---|
| Part A (wt) |  |
| PPG Triol, MW: 3000 g/mol | 40 |
| PPG Diol, MW: 2000 g/mol | 46 |
| Aromatic Ether Plasticizer | 10 |
| Antioxidant blend | 2 |
| Bismuth complex 1 | 1 |
| Carbon Black | 2 |
| Alumina filler package #1 | 800 |
| SUM Part A | 901 |
| Part B (wt) |  |
| Mondur MRS 4 | 21 |
| Monohydroxyl polyether, MW 1800 | 79 |
| Alumina filler package #1 | 800 |
| SUM Part B | 900 |
| Parameters |  |
| NCO/OH ratio | 1.24 |
| Triol wt % in Part A resin | 40 |
| Properties |  |
| Shore OO Hardness (cured at 25° C./50% RH) | 85 |
| Dispensing (Initial) g/min | 16.7 |

Mondur MRS 4 (Covestro) is a polymeric diphenylmethane-diisocyanate (pMDI) with an average functionality of 2.4, which means it contains both di- and trifunctional aromatic isocyanates. In Part B, it was partially pre-reacted with a monohydroxyl polyether (roughly 27% of the NCO groups consumed). This resulted in a mixture of mono- and difunctional aromatic isocyanates with a long pendant group, as well as unreacted di-, and trifunctional isocyanates.

Figure 1:
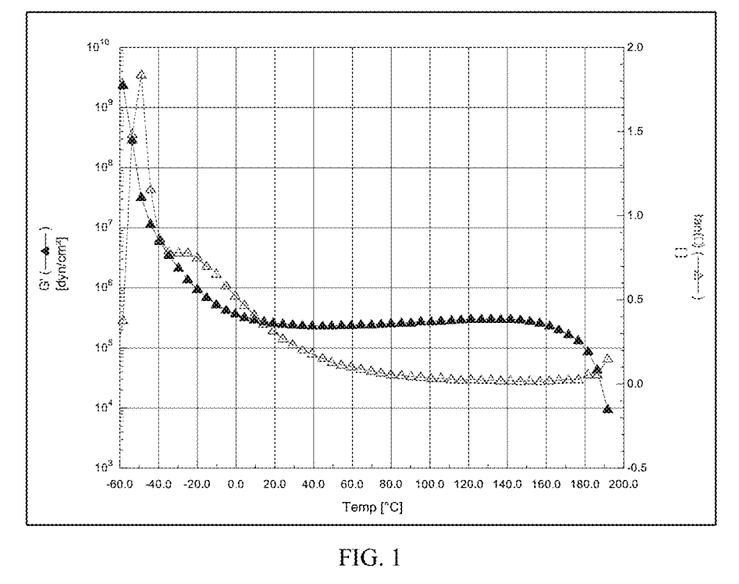
FIG. 1 depicts rheology results for an inventive composition based on a two-part polyurethane.

A sample mixture of Part A resin and B resin (50/50 by weight, fillers not included) was cured at room temperature and the rheology the sample was measured. FIG. 1 shows thermal stability of the mixture up to about 160° C.

Example 2: Aliphatic Isocyanate with Pedant Groups

TABLE 2

|  | Part |
|---|---|
| Part A (wt) |  |
| PPG Triol, MW: ~700 g/mol | 57.0 |
| PPG Diol, MW: ~425 g/mol | 41.5 |
| Bismuth/zinc complex 1 | 1.5 |
| Carbon Black | 2.0 |
| Alumina filler package #2 | 800 |
| SUM Part A | 902 |

TABLE 2-continued

|  | Part |
|---|---|
| Part B (wt) |  |
| Tolonate™ X FLO 100 | 100 |
| Antioxidant blend | 2 |
| Alumina filler package #2 | 800 |
| SUM Part B | 902 |
| Parameters |  |
| NCO/OH ratio | 0.68 |
| Triol wt % in Part A resin | 57 |
| Properties |  |
| Shore OO Hardness (cured at 25° C./50% RH) | 78 |
| Dispensing (Initial) g/min | 106 |
| Thermal conductivity (W/m * K) | 2.6 |

Figure 2:
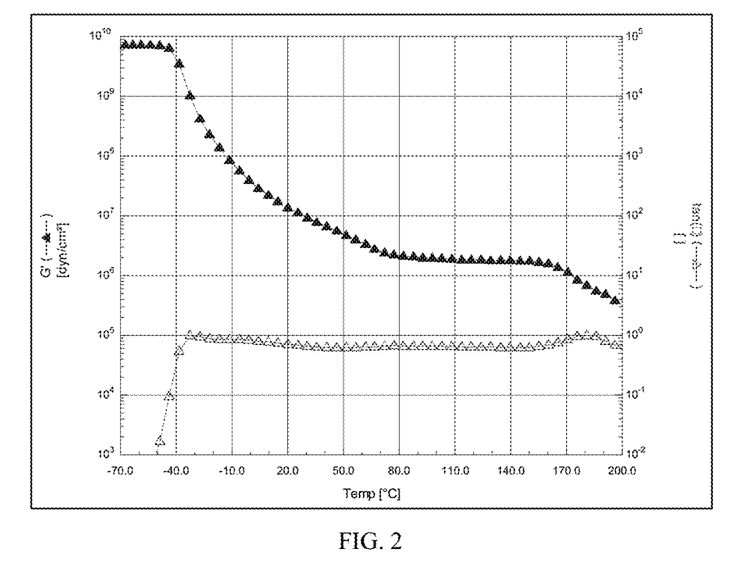
FIG. 2 depicts rheology results for an inventive composition based on a two-part polyurethane resin and alumina thermally conductive fillers.

Example 2 demonstrated the composite of this invention based on aliphatic isocyanate with pendant group (Tolonate™ X FLO 100) and triol/diol mixtures (Table 2). A rheology plot of the cured composite was shown in FIG. 2, indicating thermal stability up to about 170° C.

Example 3: High Filler Low Hardness Composition

TABLE 3

|  | Part |
|---|---|
| Part A (wt) |  |
| PPG Triol, MW: ~700 g/mol | 70 |
| PPG Diol, MW: ~425 g/mol | 28.5 |
| Bismuth/zinc complex 1 | 1.5 |
| Carbon Black | 1.8 |
| Alumina filler package #3 | 1000 |
| SUM Part A | 1102 |
| Part B (wt) |  |
| Tolonate™ X FLO 100 | 100 |
| Antioxidant blend | 2 |
| Alumina filler package #3 | 1000 |
| SUM Part B | 1102 |
| Parameters |  |
| NCO/OH ratio | 0.69 |
| Triol wt % in Part A resin | 70 |
| Properties |  |
| Shore OO Hardness (cured 25° C./50% RH 7 d after preparation) | 64 |
| Dispensing (Initial) g/min | 32 |

Example 3 demonstrated that by adjusting triol/diol ratio, as well as conductive filler package, one can achieve higher filler loading while maintaining low Shore 00 hardness (Table 3).

Examples 4 and 5: Formulation Containing Isocyanate-Functionalized Moisture Scavenger p-Toluenesulfonyl Isocyanate

TABLE 4

|  | Example 4 | Example 5 |
|---|---|---|
| Part A (wt) | | |
| PPG Triol, MW: ~700 g/mol | 98 | 88.8 |
| PPG Triol, MW: ~3300 g/mol | 0 | 10.3 |
| Bismuth complex 2 | 1.5 | 0.73 |
| Carbon Black | 2 | 2 |
| Alumina filler package #3 | 1000 | 1000 |
| SUM Part A | 1102 | 1102 |
| Part B (wt) | | |
| Tolonate™ X FLO 100 | 95 | 95 |
| p-toluenesulfonyl isocyanate | 5 | 5 |
| Antioxidant blend | 2 | 2 |
| Alumina filler package #3 | 1000 | 1000 |
| SUM Part B | 1102 | 1102 |
| Parameters | | |
| NCO/OH ratio | 0.74 | 0.80 |
| Triol % in part A resin | 98 | 99.1 |
| Properties | | |
| Shore OO Hardness (@ 25° C./50% RH) | 88 | 82 |
| Dispensing (Initial) g/min | 12.9 | na |

Examples 4 and 5 demonstrated successful incorporation of isocyanate functionalized moisture scavenger into our polyurethane composite formulation (Table 4).

Example 6: Formulation Containing Bio-Based Diol

TABLE 5

|  | Part |
|---|---|
| Part A (wt) | |
| PPG Triol, MW: ~700 g/mol | 80 |
| Polybutadiene Diol, Krasol F MW: ~3000 g/mol | 19 |
| Bismuth/zinc complex 1 | 1 |
| Carbon Black | 2 |
| Alumina filler package #3 | 800 |
| SUM Part A | 902 |
| Part B (wt) | |
| Tolonate™ X FLO 100 | 100 |
| Antioxidant blend | 2 |
| Alumina filler package #3 | 800 |
| SUM Part B | 902 |
| Parameters | |
| NCO/OH ratio | 0.84 |
| Triol wt % in Part A resin | 80 |
| Properties | |
| Shore OO Hardness(cured 25° C./50% RH) | 87 |
| Dispensing (Initial) g/min | 51 |

Example 6 was prepared by the following method. Part A was prepared using a speed mixer device manufactured by Flacktek (Model DAC 150 FVZ-K). Part A was mixed at 2000 RPM for 30 seconds. Part B was prepared using a speed mixer device manufactured by Flacktek (Model DAC 150 FVZ-K). Part B was mixed at 2000 RPM for 30 seconds. The cured composite was obtained by mixing Part A with Part B in a mixing device, a Loctite dual cartridge applicator equipped with 50 cc or 200 cc 2K cartridge and a 6.3-21 static mixer attached to the end of the cartridges under 0.52 MPa for 1 minute. During dispensing, Part A and Part B are fully mixed when traveling through the static mixer under applied pressure typically ranging from 0.5 to 0.65 MPa.

Example 6 demonstrates the incorporation of a sustainable polybutadiene diol from a non-petroleum feedstock into the polyurethane composite formulation (Table 5) with adequate properties such as hardness and dispensing that can be used as a thermal interface material.

Comparative Example 7: Low Triol Wt. % and Low NCO/OH Ratio Composition

TABLE 6

|  | Part |
|---|---|
| Part A (wt) | |
| PPG Triol, MW: ~700 g/mol | 29 |
| PPG Diol, MW: ~425 g/mol | 70 |
| Bismuth/zinc complex 1 | 1 |
| Carbon Black | 2 |
| Alumina filler package #3 | 800 |
| SUM Part A | 902 |
| Part B (wt) | |
| Tolonate™ X FLO 100 | 100 |
| Antioxidant blend | 2 |
| Alumina filler package #3 | 800 |
| SUM Part B | 902 |
| Parameters | |
| NCO/OH ratio | 0.66 |
| Triol wt % in Part A resin | 29 |
| Properties | |
| Shore OO Hardness (cured at 25° C./50% RH) | Too soft |
| Dispensing (Initial) g/min | na |

Comparative example 7 demonstrates that as the level of triol fell below 30 wt. %, and NCO/OH ratio dropped to 0.68, the cured composite was too soft and lost integrity due to lack of sufficient crosslinking (Table 6).

Comparative Example 8: Flexible Polyurethane without Pedant Groups

TABLE 7

|  | Part |
|---|---|
| Part A (wt) | |
| PPG Triol, MW: ~3300 g/mol | 60 |
| PPG Diol, MW: ~2000 g/mol | 10 |
| PPG Diol, MW: ~3025 g/mol | 29 |
| Bismuth/zinc complex 1 | 1 |
| Carbon Black | 2 |
| Alumina filler package #3 | 800 |
| SUM Part A | 902 |

TABLE 7-continued

| | Part |
|---|---|
| Part B (wt) | |
| Tolylene 2,4-diisocyanate terminated PPG, MW: ~2300 g/mol | 100 |
| Antioxidant blend | 2 |
| Alumina filler package #3 | 800 |
| SUM Part B | 902 |
| Parameters | |
| NCO/OH ratio | 0.96 |
| Triol wt % in Part A resin | 60 |
| Properties | |
| Shore OO Hardness (cured at 25° C./50% RH) | 96 |
| Dispensing (Initial) g/min | NA |

Comparative Example 8 was prepared by the following method. Part A was prepared using a speed mixer device manufactured by Flacktek (Model DAC 150 FVZ-K). Part A was mixed at 2000 RPM for 30 seconds. Part B was prepared using a speed mixer device manufactured by Flacktek (Model DAC 150 FVZ-K). Part B was mixed at 2000 RPM for 30 seconds. The cured composite was obtained by mixing Part A with Part B in a mixing device, a Loctite dual cartridge applicator equipped with 50 cc or 200 cc 2K cartridge and a 6.3-21 static mixer attached to the end of the cartridges under 0.52 MPa for 1 minute. During dispensing, Part A and Part B are fully mixed when traveling through the static mixer under applied pressure typically ranging from 0.5 to 0.65 MPa.

In Comparative Example 8, tolylene 2,4-diisocyanate terminated poly(propylene glycol) was obtained from Aldrich. This material has MW 2300 g/mol and its isocyanate level is ~3.6 wt. %. In this design, we chose NCO/OH ratio close to 1.0 (0.96), so that almost all reactive groups are consumed and insignificant amounts of the triol/diol or the di-isocyanate could contribute to long pendant groups after cure. After curing, we obtained a hard composite with 96 Shore OO hardness which is not suitable for our intended application (Table 7).

Tolylene 2,4-diisocyanate terminated poly(propylene glycol) has the following structure:

What is claimed is:

1. A composition comprising a polyurethane resin and a thermally conductive filler, wherein the polyurethane resin is formed from two parts comprising:
   a first part comprising a triol and a first thermally conductive filler; and
   a second part comprising an isocyanate-functionalized component and a second thermally conductive filler,
   wherein:
   the first thermally conductive filler is present in the first part in an amount of from 35 wt. % to 95 wt. %, based on the total weight of the first part,
   the second thermally conductive filler is present in the second part in an amount of from 85 wt. % to 95 wt. %, based on the total weight of the second part,
   the molar ratio of NCO groups to OH groups in the composition is less than 1.3, and
   the first thermally conductive filler and the second thermally conductive filler are dispersed throughout the polyurethane resin.

2. The composition of claim 1, wherein the triol is selected from the group consisting of polypropylene glycol triol, poly(trimethylene) glycol triol, poly(tetramethylene ether) glycol triol, 2-methyl-1,3-propanediol adipate triol, and any combination thereof.

3. The composition of claim 1, wherein the triol has a number average molecular weight of from about 200 to about 5000 g/mol.

4. The composition of claim 1, wherein the first part further comprises a diol.

5. The composition of claim 4, wherein the diol has a number average molecular weight of from about 200 g/mol to about 5000 g/mol.

6. The composition of claim 1, wherein the triol is present in the first part in an amount of from about 29 wt. % to about 100 wt. %, based on the total weight of the first part.

7. The composition of claim 1, wherein the isocyanate-functionalized component is a difunctional aliphatic isocyanate component.

8. The composition of claim 1, wherein the isocyanate-functionalized component comprises a pendant group with a number average molecular weight greater than about 100 g/mol.

9. The composition of claim 8, wherein the pendant group is selected from the group consisting of a polyether, a linear or branched alkyl, an ester, a polyester, and any combination thereof.

10. The composition of claim 1, wherein each of the first part and the second part has a number average molecular weight of less than about 5000 g/mol.

11. The composition of claim 1, wherein the composition further comprises a catalyst selected from the group consisting of an amine catalyst, a metal catalyst based on Sn, Zn, Bi, Zr, V, Ti, or Zn, a Bi based complex, and any combination thereof.

12. The composition of claim 1, wherein the first part and/or the second part further comprises a component selected from the group consisting of an antioxidant blend, a pigment, a defoamer, a phase change material, a rheology modifier, a plasticizer, a moisture scavenger, and any combination thereof.

13. The composition of claim 1, wherein the second part further comprises a component selected from the group consisting of a moisture scavenger, wherein the moisture scavenger is selected from the group consisting of oxazolidine, p-toluenesulfonyl isocyanate, vinyl oxy silane, and any combination thereof.

14. The composition of claim 1, wherein the first thermally conductive filler and/or the second thermally conductive filler is selected from the group consisting of aluminum oxide, boron nitride, aluminum nitride, magnesium oxide, zinc oxide, and any combination thereof.

15. The composition of claim 1, wherein the first thermally conductive filler and the second thermally conductive filler are the same thermally conductive filler.

16. A composition comprising a polyurethane resin and a thermally conductive filler, wherein the polyurethane resin is formed from two parts comprising:

a first part comprising a triol and a first thermally conductive filler; and a second part comprising an isocyanate-functionalized component and a second thermally conductive filler, wherein:

the first thermally conductive filler is present in the first part in an amount of from 85 wt. % to 95 wt. %, based on the total weight of the first part, the second thermally conductive filler is present in the second part in an amount of from 85 wt. % to 95 wt. %, based on the total weight of the second part, the molar ratio of NCO groups to OH groups in the composition is less than 1.3, and the first thermally conductive filler and the second thermally conductive filler are dispersed throughout the polyurethane resin.

17. A cured reaction product comprising the composition of claim 1.

18. The cured reaction product of claim 17, wherein the cured reaction product has a Shore OO hardness of less than about 90, when measured according to ASTM D2240.

19. A thermal interface material comprising the composition of claim 1.

20. An electronic device comprising a heat source, a heat sink, and the composition of claim 1 disposed between the heat source and the heat sink.

21. The electronic device of claim 20, wherein no air is disposed between the heat source and the heat sink.

* * * * *